United States Patent
Taguchi et al.

(10) Patent No.: US 11,780,123 B2
(45) Date of Patent: Oct. 10, 2023

(54) WORKPIECE MOLDING APPARATUS

(71) Applicant: HONDA MOTOR CO., LTD., Tokyo (JP)

(72) Inventors: Akira Taguchi, Tochigi-ken (JP); Hiroto Yamane, Tochigi-ken (JP); Yusuke Itose, Tochigi-ken (JP)

(73) Assignee: HONDA MOTOR CO., LTD., Tokyo (JP)

( * ) Notice: Subject to any disclaimer, the term of this patent is extended or adjusted under 35 U.S.C. 154(b) by 205 days.

(21) Appl. No.: 17/417,780

(22) PCT Filed: Jul. 31, 2019

(86) PCT No.: PCT/JP2019/030047
§ 371 (c)(1),
(2) Date: Jun. 24, 2021

(87) PCT Pub. No.: WO2020/136967
PCT Pub. Date: Jul. 2, 2020

(65) Prior Publication Data
US 2022/0072741 A1    Mar. 10, 2022

(30) Foreign Application Priority Data

Dec. 28, 2018 (JP) .................................. 2018-247362

(51) Int. Cl.
*B29C 43/18* (2006.01)
*B29C 33/14* (2006.01)
(Continued)

(52) U.S. Cl.
CPC ............ *B29C 43/184* (2013.01); *B29C 33/14* (2013.01); *B29C 43/34* (2013.01); *B29L 2031/3008* (2013.01)

(58) Field of Classification Search
CPC ... B29C 51/264; B29C 51/265; B29C 51/267; B29C 51/105; B29C 51/38; B29C 51/20;
(Continued)

(56) References Cited

U.S. PATENT DOCUMENTS 2,797,179 A * 6/1957 Kress ...................... B29C 70/28
264/296
5,108,529 A * 4/1992 Shuert ..................... B29C 51/04
156/212
(Continued)

FOREIGN PATENT DOCUMENTS

JP    2005-178218    7/2005
JP    2010-076229    4/2010

OTHER PUBLICATIONS

International Search Report and Written Opinion for International Application No. PCT/JP2019/030047 dated Oct. 15, 2019, 4 pages.
(Continued)

*Primary Examiner* — Matthew J Daniels
(74) *Attorney, Agent, or Firm* — AMIN, TUROCY & WATSON, LLP (57) ABSTRACT

This workpiece molding apparatus has a mold member equipped with a pair of metal molds that hold therebetween a workpiece being a laminate of a workpiece body and a surface skin material, and that are capable of holding, through suction, the workpiece body and the surface skin material, said workpiece molding apparatus being provided with: a surface skin material retention part which is disposed laterally to the mold member so as to retain the surface skin material and which forms a level difference between the retaining position of the workpiece body and the retaining position of the surface skin material in a non-bonded area where the surface skin material is not bonded to the workpiece body; and a forward-and-backward moving member which is disposed at the portion where the level difference (Continued)

is formed at the non-bonded area so as to cover an upside of the non-bonded area of the workpiece body.

7 Claims, 10 Drawing Sheets

(51) Int. Cl.
*B29C 43/34* (2006.01)
*B29L 31/30* (2006.01)

(58) Field of Classification Search
CPC .......... B29C 43/203; B29C 2043/3602; B29C 43/184; B29C 43/183
See application file for complete search history.

(56) References Cited

U.S. PATENT DOCUMENTS

| | | | | |
|---|---|---|---|---|
| 5,238,640 | A * | 8/1993 | Masui | B29C 45/14262 264/296 |
| 5,283,028 | A * | 2/1994 | Breezer | B29C 43/34 156/228 |
| 5,622,667 | A * | 4/1997 | Fujiyama | B29C 43/184 264/510 |
| 5,656,127 | A * | 8/1997 | De Niel | B29C 63/0013 156/764 |
| 5,746,870 | A * | 5/1998 | Tomioka | B29C 51/16 264/249 |
| 6,783,718 | B2 * | 8/2004 | Blanchon | B29C 45/14 264/257 |
| 7,997,894 | B2 * | 8/2011 | Schilles | B29C 43/203 425/510 |
| 9,302,458 | B2 * | 4/2016 | Huelke | B32B 27/40 |
| 2006/0220274 | A1 * | 10/2006 | Dooley | B29C 51/087 425/468 |
| 2008/0115555 | A1 * | 5/2008 | Depase | B29C 70/345 72/343 |
| 2008/0211128 | A1 * | 9/2008 | Lucier | B29C 51/267 425/387.1 |

OTHER PUBLICATIONS

Chinese Office Action and Search Report for Chinese Patent Application No. 201980086879.7 dated Jul. 25, 2022.

* cited by examiner

WORKPIECE MOLDING APPARATUS

TECHNICAL FIELD

The present invention relates to a workpiece molding apparatus configured to adhere a surface skin material to a workpiece main body.

BACKGROUND ART

Conventionally, on an instrument panel or the like of a vehicle, a laminated body, in which a flexible and leather-like surface skin material is adhered to a workpiece main body made of resin and formed into a predetermined shape, has been used. This type of laminated body is formed by superimposing the surface skin material on a workpiece main body via an adhesive, and sandwiching the workpiece between an upper mold and a lower mold and applying pressure thereto while applying vacuum suction to the workpiece to remove an air layer (for example, see JP 2005-178218 A).

JP 2005-178218 A discloses a molding method in which, when the surface skin material is placed on the workpiece main body (base material), a non-adhered location of the workpiece main body where the surface skin material is not laminated is covered by a shielding plate, whereby excess portions of the surface skin material are subjected to masking.

SUMMARY OF INVENTION

However, with the technique disclosed in JP 2005-178218 A, when the size of the workpiece main body is large in scale, the size of the shielding plate needs to be increased, which leads to the shielding plate becoming heavy, and the operations of the apparatus become sluggish.

Therefore, the present invention has the object of providing a workpiece molding apparatus which is excellent in terms of productivity, and is suitable for providing a non-laminated portion in which a surface skin material is not adhered to a portion of a workpiece main body.

One aspect of the present invention is characterized by a workpiece molding apparatus, comprising a mold member including a pair of molds configured to sandwich a workpiece in which a workpiece main body and a surface skin material are laminated together, and hold the workpiece main body and the surface skin material by suction, a surface skin material retaining member arranged laterally of the mold member and configured to retain the surface skin material and provide a step between a retained position where the workpiece main body is retained and a retained position where the surface skin material is retained, at a non-adhered location where the surface skin material is not adhered to the workpiece main body, and an advancing and retracting member configured to cover an upper side of the non-adhered location of the workpiece main body when arranged on the step of the non-adhered location.

In accordance with the workpiece molding apparatus according to the present invention, the workpiece main body and the surface skin material can be separated from each other by covering, with the advancing and retracting member, the non-adhered location of the workpiece main body where the surface skin material is not laminated. Further, in such a workpiece molding apparatus, since it is sufficient only to subject the advancing and retracting member to the advancing and retracting operation, the configuration of the apparatus can be kept small in scale, and the operations thereof are performed quickly.

DESCRIPTION OF EMBODIMENTS

Hereinafter, preferred embodiments of the present invention will be presented and described in detail below with reference to the accompanying drawings.

First Embodiment

A workpiece molding apparatus 10 according to the present embodiment is used when a flexible surface skin material 14 (see FIG. 5A) is adhered and laminated on a workpiece main body 12 made of resin (see FIG. 5A) and constituting, for example, an instrument panel of a vehicle. The workpiece main body 12 is equipped with an adhered location 12a which is exposed to the vehicle interior and to which the surface skin material 14 needs to be adhered, and a non-adhered location 12b which is used for fixing to another member or the like and to which the surface skin material 14 is not adhered. The workpiece molding apparatus 10 is configured to maintain the surface skin material 14 separated from the workpiece main body 12, so that the surface skin material 14 is not adhered to the non-adhered location 12b of the workpiece main body 12. Hereinafter, a description will be presented in further detail concerning the respective components of the workpiece molding apparatus 10.

Figure 1:
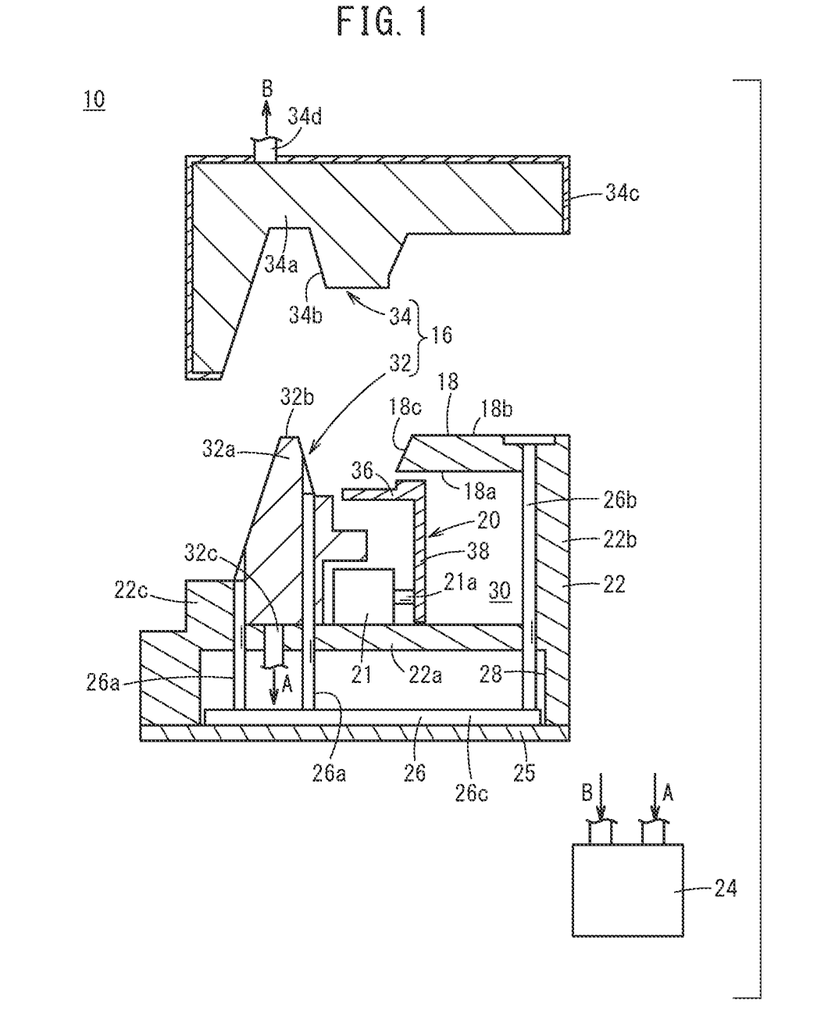
FIG. 1 is a cross-sectional view of a workpiece molding apparatus according to a first embodiment of the present invention.

As shown in FIG. 1, the workpiece molding apparatus 10 includes a mold member 16, a surface skin material retaining member 18, an advancing and retracting member 20, a frame member 22, and an air expulsion device 24. Among these components, the mold member 16 includes a lower mold 32 and an upper mold 34. The lower mold 32 is retained by the frame member 22. The lower mold 32 is equipped with a main body 32a having a surface 32b formed in a shape conforming to the shape of the workpiece main body 12, which will be described later, and an exhaust port 32c provided on a bottom portion of the main body 32a. The main body 32a is formed to be equipped with a porous material or a plurality of air passages therein, and thus possesses air permeability. The exhaust port 32c communicates through a pipe with the air expulsion device 24. More specifically, the lower mold 32 is capable of exhausting air in close proximity to the surface 32b through the main body 32a and the exhaust port 32c.

Figure 2A:
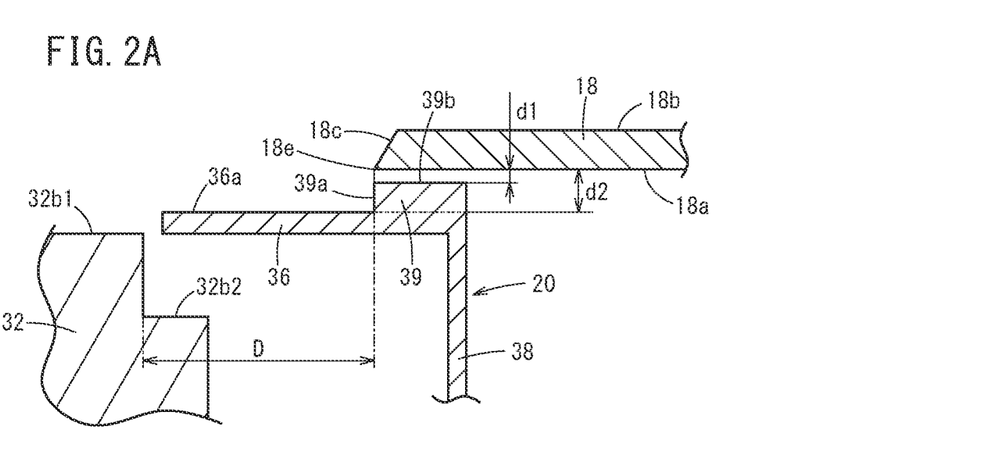
FIG. 2A is a cross-sectional view showing an advanced position of an advancing and retracting member shown in FIG. 1.

As shown in FIG. 2A, an adhered region 32b1 in which the adhered location 12a (see FIG. 4A) of the workpiece main body 12 is arranged, and a non-adhered region 32b2 in which the non-adhered location 12b (see FIG. 4A) of the workpiece main body 12 is arranged are provided on the surface 32b of the lower mold 32. A step is disposed between the non-adhered region 32b2 and the adhered region 32b1, and via the step, the non-adhered region 32b2 is formed at a position lower than the adhered region 32b1.

As shown in FIG. 1, the upper mold 34 is retained by a non-illustrated pressing unit, and is pressed against the side of the lower mold 32 accompanying a pressing operation of the pressing unit. The upper mold 34 is equipped with a main body 34a having a surface 34b having a shape corresponding to the surface 32b of the lower mold 32, the upper surface of a shutter plate 36, and the upper surface of the surface skin material retaining member 18. The main body 34a is provided with an air-permeable porous material or a plurality of air passages, and a side portion and an upper end portion thereof are covered by an airtight covering material 34c. An exhaust port 34d is disposed on an upper end portion of the covering material 34c. The exhaust port 34d communicates via a pipe with the air expulsion device 24. The upper mold 34 is capable of exhausting air in close proximity to the surface 34b via the main body 34a, which possesses air permeability, and the exhaust port 34d.

The frame member 22 comprises a support member 22a that supports the lower mold 32, a first side wall portion 22b and a second side wall portion 22c extending upwardly from the support member 22a, an accommodating recess 28 formed on a lower end side of the support member 22a, and a bottom plate member 25 that closes the accommodating recess 28.

The support member 22a is a plate-shaped member supporting the lower mold 32, and is disposed below the lower mold 32. The support member 22a is formed over a wider range than the lower mold 32. The first side wall portion 22b extends upwardly from one end part of the support member 22a. The first side wall portion 22b is formed while being separated from the lower mold 32, and the advancing and retracting member 20 is installed on the support member 22a between the first side wall portion 22b and the lower mold 32.

Further, on another end side of the support member 22a, the second side wall portion 22c is formed to extend upwardly adjacent to a side portion of the lower mold 32. The second side wall portion 22c is configured to support the side portion of the lower mold 32 and to function as a covering material that prevents inflowing of air through the side portion of the lower mold 32. The support member 22a, the first side wall portion 22b, and the second side wall portion 22c are formed together integrally so that there is no gap for inflowing of air therebetween, and a vacant chamber 30 is formed inside thereof. Moreover, the support member 22a, the first side wall portion 22b, and the second side wall portion 22c may be formed by being joined to another member via a seal member.

The surface skin material retaining member 18 is a plate-shaped member arranged above and facing the support member 22a, and extends from the first side wall portion 22b toward the lower mold 32. The surface skin material retaining member 18 is formed together integrally with the first side wall portion 22b, and constitutes an upper end portion of the vacant chamber 30. The surface skin material retaining member 18 comprises an upper surface 18b, a lower surface 18a, and a distal end surface 18c. On the upper surface 18b, a remaining portion of the surface skin material 14 that is not adhered to the adhered location 12a of the workpiece main body 12 is placed. The upper surface 18b (see FIG. 5A) is coated with a material to ensure mold releasability in order to prevent the surface skin material 14 from becoming adhered and fixed thereon. If necessary, a mold releasing agent such as silicone oil may be applied to the upper surface 18b.

The lower surface 18a is a surface formed to face the support member 22a, and is formed as a surface that is substantially parallel to the support member 22a. The distal end surface 18c is configured as an inclined surface, which is inclined so that a distal end of the lower surface 18a extends in closer proximity to the lower mold 32 than a distal end of the upper surface 18b. The lower surface 18a of the surface skin material retaining member 18 is formed at substantially the same height as the adhered region 32b1 of the lower mold 32, and is disposed at a position that is higher than the non-adhered region 32b2 of the lower mold 32.

More specifically, as shown in FIG. 2A, the surface skin material retaining member 18 is configured in a manner so that a step (a difference in the heightwise direction) provided whereby the retained position of the surface skin material 14 is located above the retained position (the adhered region 32b1) of the workpiece main body 12. The surface skin material retaining member 18 supports the surface skin material 14 by receiving and bearing a portion of the atmospheric pressure applied to the surface skin material 14 when the vacant chamber 30 is depressurized.

Figure 3:
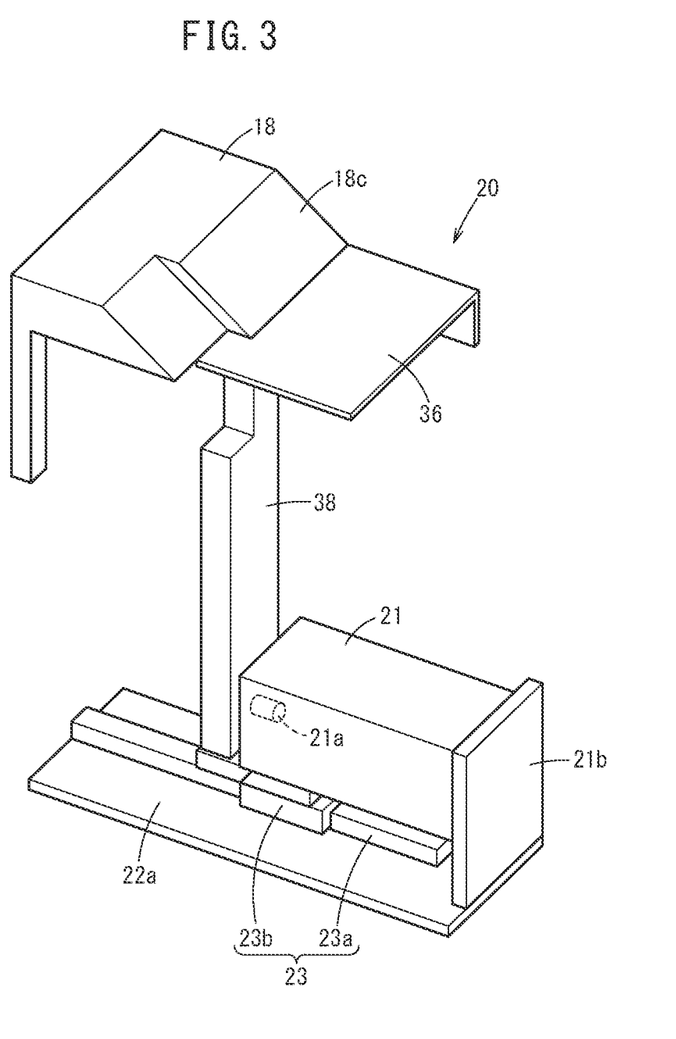
FIG. 3 is a perspective view of a surface skin material retaining member and the advancing and retracting member shown in FIG. 1.

As shown in FIG. 1, the advancing and retracting member 20 is provided in the vacant chamber 30 of the frame member 22. As shown in FIG. 3, the advancing and retracting member 20 includes a drive unit 21 that is fixed to the support member 22a. The drive unit 21 is made up, for example, from an air cylinder, and is fixed to the support member 22a via a fixing member 21b. The drive unit 21 comprises a rod 21a, and is operated so as to push out or pull in the rod 21a.

An upwardly extending support column 38 is joined to the rod 21a, and the shutter plate 36 that extends toward the side of the lower mold 32 (the right side in the drawing) is disposed on an upper end of the support column 38. Further, a guide member 23, which is equipped with a slider 23b and a guide rail 23a, is provided at a lower end of the support column 38. The guide rail 23a extends along the direction of movement of the rod 21a, and is fixed to the support member 22a. The slider 23b slides along the guide rail 23a. By the drive unit 21 pulling in the rod 21a, the shutter plate 36 advances to the side of the lower mold 32, and by the drive unit 21 pushing out the rod 21a, the shutter plate 36 is retracted underneath the surface skin material retaining member 18.

As shown in FIG. 2A, at the advanced position of the shutter plate 36, the advancing and retracting member 20 of the present embodiment is arranged with the distal end thereof being in close proximity to an end of the adhered region 32b1 of the lower mold 32. The height of the shutter plate 36 at the advanced position is higher than the non-adhered region 32b2 of the lower mold 32, and the shutter plate 36 is arranged above and separated from the non-adhered region 32b2. Further, a convex portion 39 is formed in an upwardly projecting manner on an upper surface 36a of the shutter plate 36.

The convex portion 39 comprises an upper surface 39b facing toward the lower surface 18a of the surface skin material retaining member 18, and an end surface 39a oriented toward a distal end side of the shutter plate 36. The end surface 39a is formed as a surface that is substantially perpendicular to the upper surface 36a of the shutter plate 36. It should be noted that the end surface 39a is not limited to being a surface that is perpendicular to the upper surface 36a, and may be an inclined surface. At the advanced position of the shutter plate 36, the end surface 39a is formed at a location which is substantially at the same position as a distal end portion 18e of the surface skin material retaining member 18.

In order to facilitate the retracting operation of the shutter plate 36 underneath the surface skin material retaining member 18, the upper surface 39b of the convex portion 39 is formed so as to leave a predetermined interval d1. The interval d1 is preferably set to a value that is smaller than the thickness of the surface skin material 14, in order to prevent the surface skin material 14 (see FIG. 6) from being torn when the lower mold 32 is subjected to vacuum suction, as will be described later. Further, an interval d2 between the upper surface 36a of the shutter plate 36 and the lower surface 18a of the surface skin material retaining member 18 is preferably set to a value that is at least two times the thickness of the surface skin material 14, in order to prevent the surface skin material 14 from becoming dragged in (see FIG. 8A) during the retracting operation of the shutter plate 36.

Figure 2B:
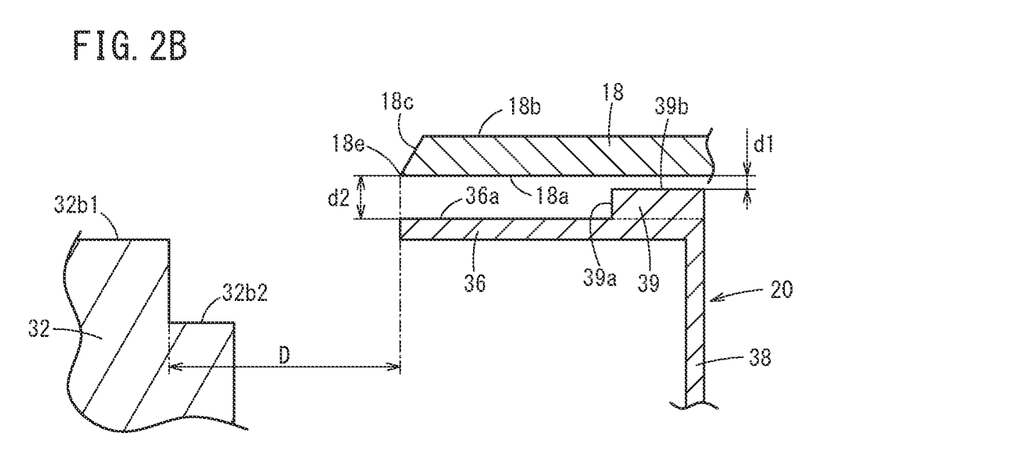
FIG. 2B is a cross-sectional view showing a retracted position of the advancing and retracting member shown in FIG. 1.

As shown in FIG. 2B, at the retracted position at which the advancing and retracting member 20 is completely retracted, the entirety of the shutter plate 36 is disposed below the surface skin material retaining member 18. Owing to this feature, the portion shown as a region D in the drawing is opened, and the workpiece main body 12 is capable of being inwardly transported or outwardly transported without being hindered by the shutter plate 36. At the retracted position, the shutter plate 36 is configured so as to be positioned below the distal end portion 18e of the surface skin material retaining member 18, or in a direction farther away from the lower mold 32 (in a rightward direction as shown in the drawing) than that.

Moreover, the shutter plate 36 and the surface skin material retaining member 18 are formed, for example, from a steel material (SPCC or SS400), and the thickness thereof can be, for example, greater than or equal to 2.6 mm. Further, the thickness of the convex portion 39 can be on the order of 5 mm. The interval d1 of the gap between the shutter plate 36 and the surface skin material retaining member 18 is preferably less than or equal to 2 mm. Further, it is preferable for the surface of the shutter plate 36 to be covered with a material that is superior in terms of mold releasability.

As shown in FIG. 1, the accommodating recess 28 is formed in the interior of the frame member 22. A mold releasing member 26 for peeling off a workpiece 17 (see FIG. 7A) that is adhered to the lower mold 32 and the surface skin material retaining member 18 is provided in the accommodating recess 28. The mold releasing member 26 comprises an ejector plate 26c that is raised by a non-illustrated drive unit, and pushing pins 26a and 26b that extend upwardly from the ejector plate 26c. The pushing pins 26a are inserted into holes that penetrate through the frame member 22 and the lower mold 32, and the pushing pin 26b is inserted into a hole that penetrates through the frame member 22 and the surface skin material retaining member 18. When the ejector plate 26c is raised by operation of the drive unit, the pushing pins 26a and 26b are pushed out upwardly, and the workpiece main body 12 that is adhered to the lower mold 32 and the surface skin material 14 that is adhered to the surface skin material retaining member 18 are capable of being peeled off.

The workpiece molding apparatus 10 according to the present embodiment is configured in the manner described above, and operations thereof will be described hereinafter.

Figure 4A:
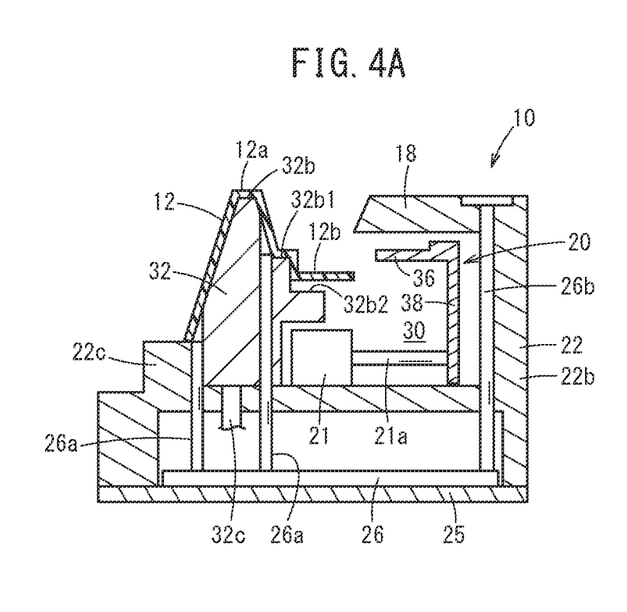
FIG. 4A is a cross-sectional view showing a step of transporting a workpiece main body into the workpiece molding apparatus.

As shown in FIG. 4A, initially, the workpiece main body 12 is transported into the workpiece molding apparatus 10. At that time, the advancing and retracting member 20 of the workpiece molding apparatus 10 is positioned at the retracted position, and the shutter plate 36 is placed in a state of being accommodated underneath the surface skin material retaining member 18. Concerning the workpiece main body 12, the adhered location 12a thereof is disposed at the adhered region 32b1 of the lower mold 32, and the non-adhered location 12b thereof is inserted in the vacant chamber 30 through the opening between the lower mold 32 and the surface skin material retaining member 18. The non-adhered location 12b is disposed at the non-adhered region 32b2 of the lower mold 32. An adhesive may be applied to an upper surface (joining surface) of the workpiece main body 12.

Figure 4B:
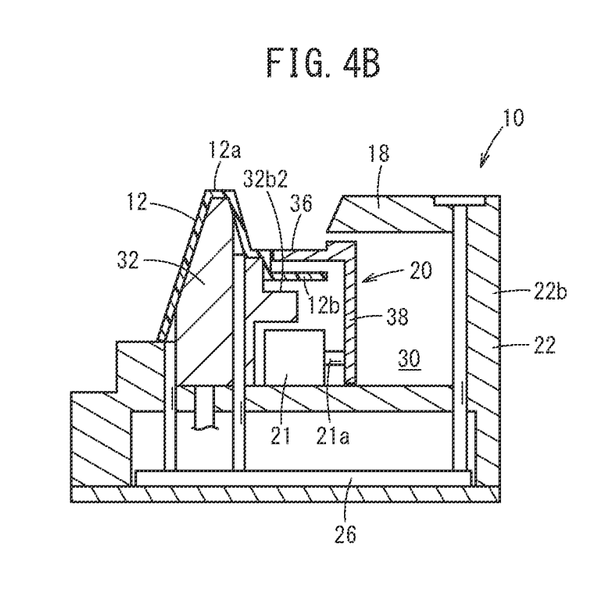
FIG. 4B is a cross-sectional view showing a state in which a non-adhered location of the workpiece main body is covered by the advancing and retracting member.

Thereafter, as shown in FIG. 4B, the drive unit 21 is operated to displace the advancing and retracting member 20 to the advanced position. Consequently, the shutter plate 36 is arranged so as to cover the non-adhered location 12b of the workpiece main body 12.

Figure 5A:
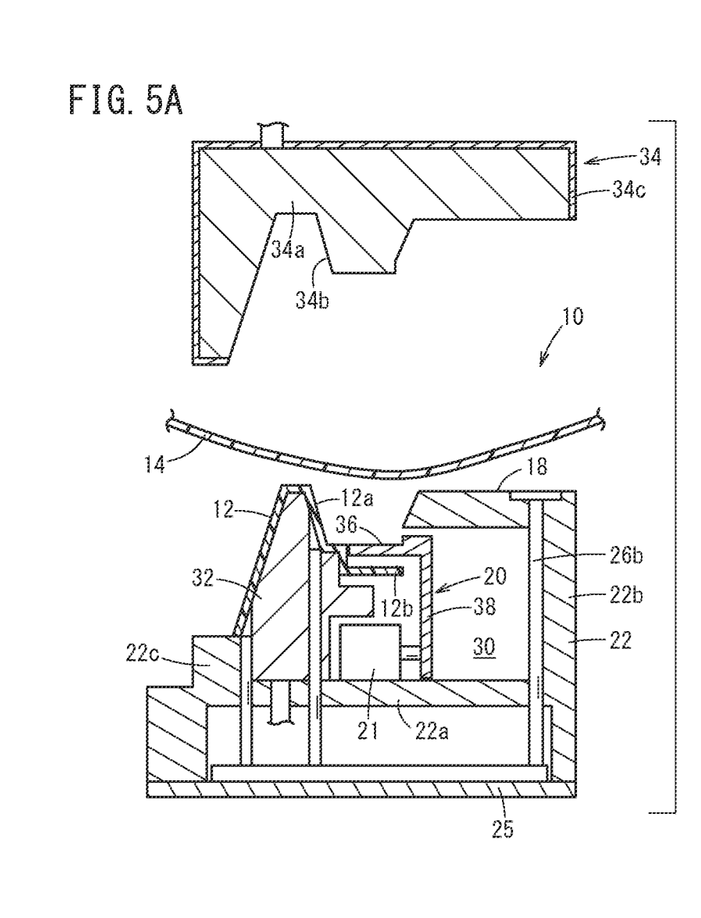
FIG. 5A is a cross-sectional view showing a step of inwardly transporting a surface skin material.

Next, as shown in FIG. 5A, the surface skin material 14 is transported into the workpiece molding apparatus 10. The surface skin material 14 is arranged in a manner so as to cover at least a range from the second side wall portion 22c to the first side wall portion 22b, and is placed so as to cover and close a gap between the frame member 22 and the lower mold 32, a gap between the shutter plate 36 and the workpiece main body 12, and a gap between the shutter plate 36 and the surface skin material retaining member 18. Moreover, an adhesive is applied to the lower surface (joining surface) of the surface skin material 14. Prior to being transported into the workpiece molding apparatus 10, the surface skin material 14 may be subjected to a process of being heated to a predetermined temperature to be softened.

Figure 5B:
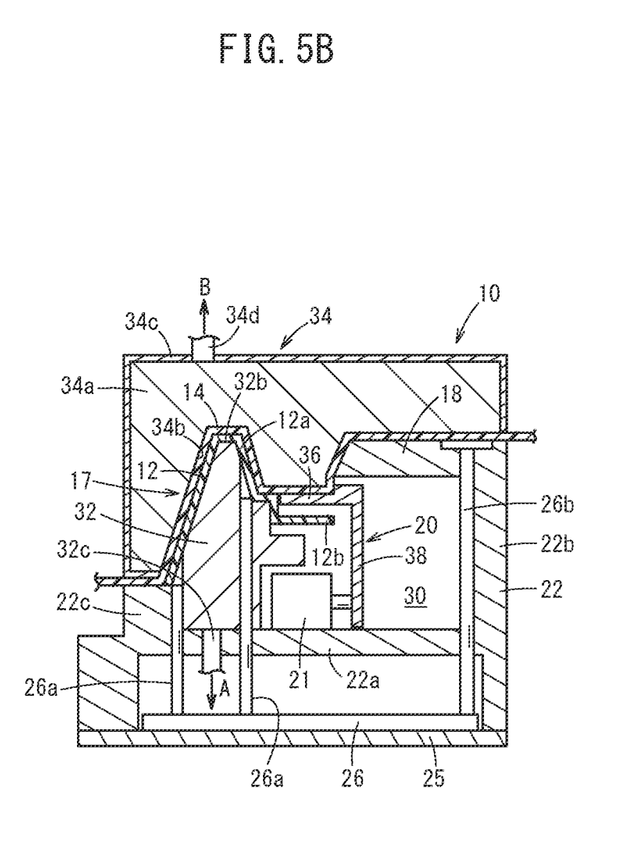
FIG. 5B is a cross-sectional view showing a laminating step in which the workpiece main body and the surface skin material are pressed by a mold member to thereby be joined together.

Thereafter, as shown in FIG. 5B, the upper mold 34 is pushed down, and the workpiece main body 12 and the surface skin material 14 are pressed and placed in intimate contact between the surface 34b of the upper mold 34 and the surface 32b of the lower mold 32. Furthermore, the air expulsion device 24 (see FIG. 1) is operated, and as shown by the arrow B in FIG. 5B, expulsion of air from the upper mold 34 is carried out through the exhaust port 34d. Consequently, the air between the surface skin material 14 and the upper mold 34 is evacuated, and wrinkles or irregularities in the surface skin material 14 are removed.

Thereafter, as shown by the arrow A in FIG. 5B, expulsion of air from the lower mold 32 is carried out through the exhaust port 32c. Consequently, the air between the workpiece main body 12 and the surface skin material 14 is removed, and the intimate contact between the workpiece main body 12 and the surface skin material 14 progresses. At that time, the air in the vacant chamber 30 which is covered with the surface skin material 14 is also evacuated, and the vacant chamber 30 is placed in a depressurized state.

Figure 6:
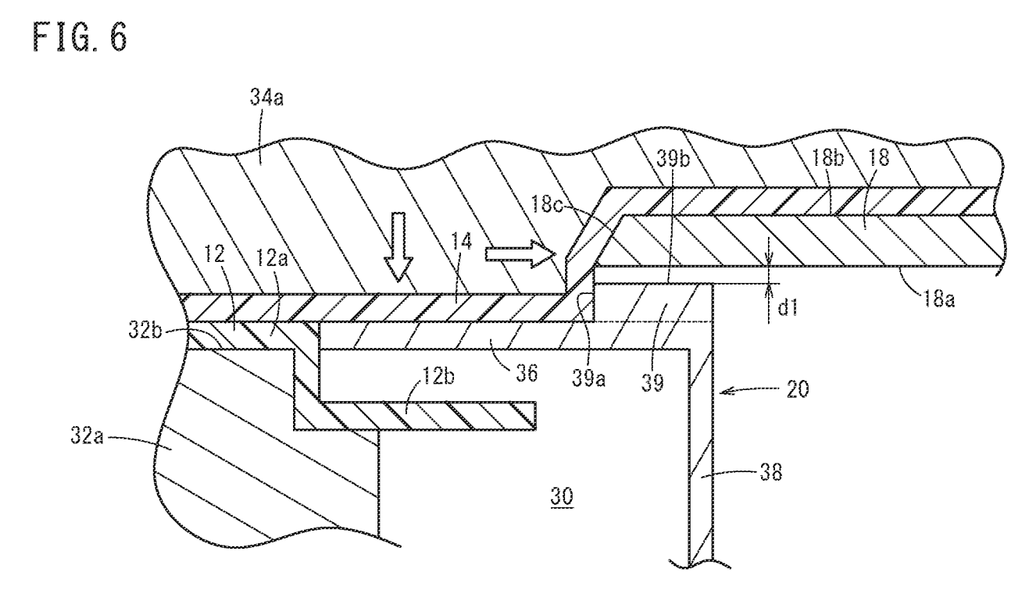
FIG. 6 is a cross-sectional view showing an action of a convex portion of the advancing and retracting member in the laminating step.

As shown in FIG. 6, when the vacant chamber 30 is in the depressurized state, atmospheric pressure acts on the surface skin material 14, whereby a force acts that presses the surface skin material 14 toward the workpiece main body 12. With the workpiece molding apparatus 10 according to the present embodiment, since the upper side of the non-adhered location 12b of the workpiece main body 12 is covered by the shutter plate 36 of the advancing and retracting member 20, the surface skin material 14 is kept in a state of being separated from the workpiece main body 12. Consequently, it is possible to prevent the surface skin material 14 from becoming adhered to the non-adhered location 12b of the workpiece main body 12. Further, by providing the convex portion 39 on the shutter plate 36, the gap between the shutter plate 36 and the surface skin material retaining member 18 is narrowed to being a gap d1 that is narrower than the thickness of the surface skin material 14. Owing to this feature, even in the case that the atmospheric pressure acts on the surface skin material 14 as indicated by the arrows, it is possible to prevent the surface skin material 14 from being pulled into the gap and torn. More specifically, the force due to the atmospheric pressure acting on the portion of the surface skin material 14 that contacts the end surface 39a of the convex portion 39 is received and borne by the end surface 39a of the convex portion 39. Moreover, the interval d1, for example, is preferably less than or equal to 2 mm.

Figure 7A:
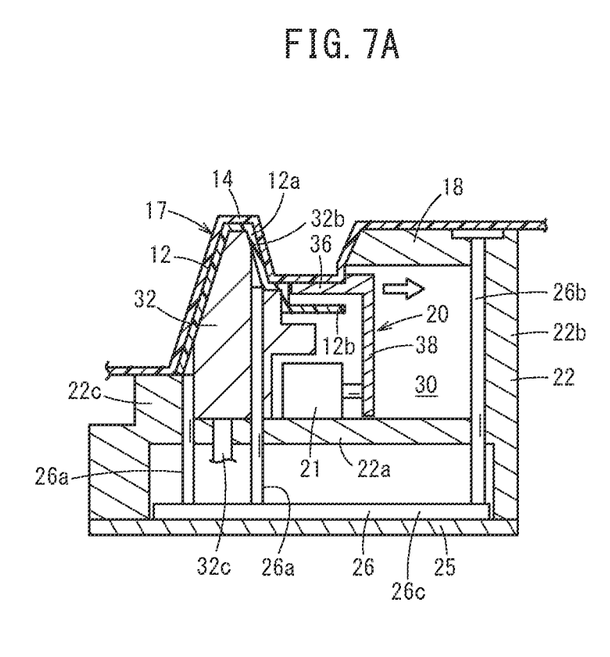
FIG. 7A is a cross-sectional view showing a retracting operation of the advancing and retracting member.

Thereafter, as shown in FIG. 7A, the upper mold 34 is taken out. Thereafter, in order to enable the workpiece main body 12 and the surface skin material 14 to be outwardly transported, the advancing and retracting member 20 is displaced to the retracted position.

Figure 8A:
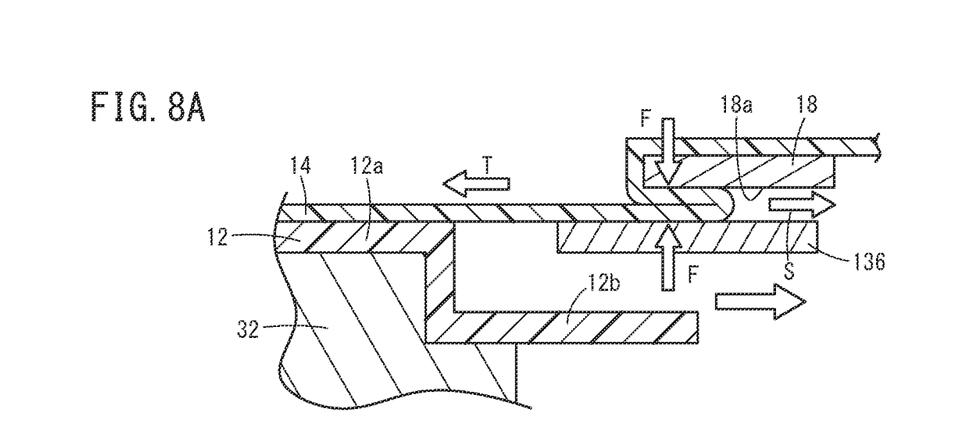
FIG. 8A is a cross-sectional view showing a retracting operation of an advancing and retracting member according to a comparative example.
Figure 8B:
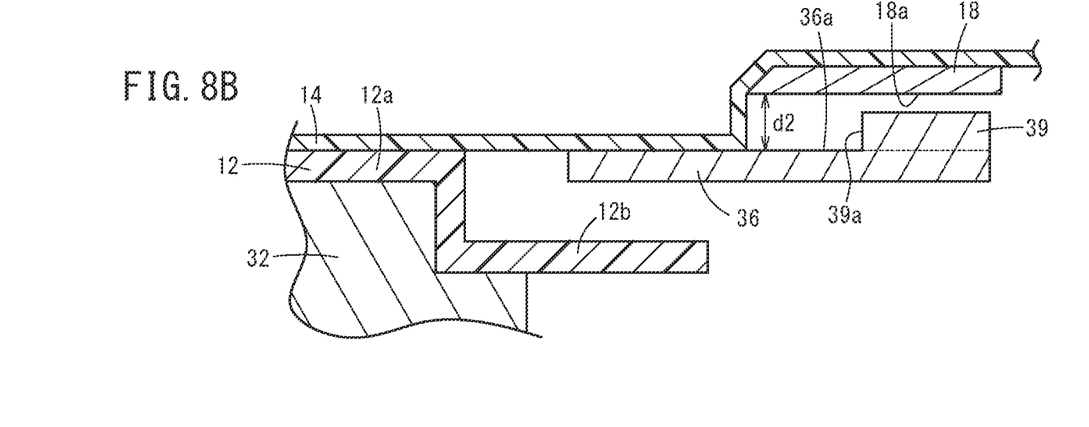
FIG. 8B is a cross-sectional view showing a retracting operation of the advancing and retracting member according to the embodiment.

In the workpiece molding apparatus 10 according to the present embodiment, as shown in FIG. 8B, the interval d2 between the upper surface 36a of the shutter plate 36 of the advancing and retracting member 20, and the lower surface 18a of the surface skin material retaining member 18 is at least two times the thickness of the surface skin material 14. Consequently, when the shutter plate 36 is displaced to the retracted position, it is possible to prevent the surface skin material 14 from becoming caught between the shutter plate 36 and the lower surface 18a of the surface skin material retaining member 18.

Moreover, as shown in a shutter plate 136 according to a comparative example shown in FIG. 8A, in the case that the interval between the lower surface 18a of the surface skin material retaining member 18 and the shutter plate 136 is less than or equal to two times the thickness of the surface skin material 14, the surface skin material 14 becomes caught in an overlapping manner, as shown in the drawing, between the surface skin material retaining member 18 and the shutter plate 136, and biasing forces F act thereon from directions above and below the surface skin material 14. As a result, a force S that inwardly pulls on the surface skin material 14 may exceed the tension T of the surface skin material 14, and a trouble may occur in which the surface skin material 14 is pulled inward.

In contrast thereto, as shown in FIG. 8B, in the workpiece molding apparatus 10 according to the present embodiment, since the interval d2 between the shutter plate 36 and the lower surface 18a of the surface skin material retaining member 18 is formed to be at least two times the thickness of the surface skin material 14, the biasing forces F do not act from above and below the pulled-in surface skin material 14. As a result, it is possible to prevent the surface skin material 14 from becoming caught and pulled in due to the movement of the shutter plate 36.

Figure 7B:
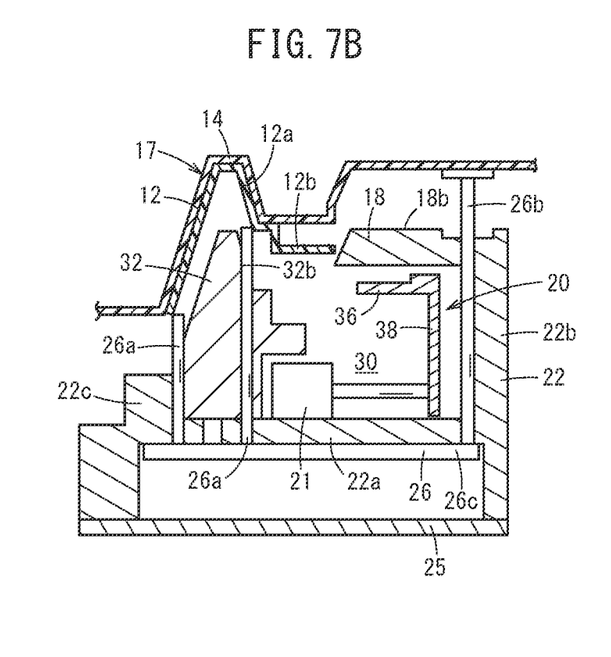
FIG. 7B is a cross-sectional view showing a step of releasing the workpiece from a lower mold and the surface skin material retaining member.

Thereafter, as shown in FIG. 7B, by raising the ejector plate 26c, the pushing pins 26a and 26b are made to project out from the surface 32b of the lower mold 32 and the upper surface 18b of the surface skin material retaining member 18. Consequently, the workpiece main body 12 separates away from the lower mold 32, and the surface skin material 14 is peeled off from the upper surface 18b of the surface skin material retaining member 18. Thereafter, by outwardly transporting the workpiece 17 in which the surface skin material 14 is laminated on the workpiece main body 12, adhering of the surface skin material 14 to the workpiece main body 12 is completed.

The workpiece molding apparatus 10 according to the present embodiment realizes the following advantageous effects.

The workpiece molding apparatus 10 according to the present embodiment comprises the mold member 16 having the pair of molds (the lower mold 32 and the upper mold 34) that sandwich the workpiece 17 in which the workpiece main body 12 and the surface skin material 14 are laminated together, and that are capable of holding the workpiece main body 12 and the surface skin material 14 by suction, the surface skin material retaining member 18 which is arranged laterally of the mold member 16, retains the surface skin material 14, and provides the step between the retained position (the adhered region 32b1) where the workpiece main body 12 is retained and the retained position where the surface skin material 14 is retained, at the non-adhered location 12b where the surface skin material 14 is not adhered to the workpiece main body 12, and the advancing and retracting member 20 arranged on the step of the non-adhered location 12b at the advanced position thereof so as to cover the upper side of the non-adhered location 12b of the workpiece main body 12. In accordance with such a configuration, merely by causing the advancing and retracting member 20 to be advanced and retracted, the non-adhered location 12b of the workpiece main body 12 can be covered, and therefore, the configuration of the apparatus is kept small in scale along with minimizing the size and scale of the movable members. Further, the operations of the workpiece molding apparatus 10 can be quickly preformed.

The workpiece molding apparatus 10 may further comprise the drive unit 21 which causes the advancing and retracting member 20 to be advanced toward the non-adhered location 12b when the surface skin material 14 is arranged on the workpiece main body 12, and causes the advancing and retracting member 20 to be retracted from the advanced position after the surface skin material 14 and the workpiece main body 12 have been adhered to each other. In this manner, at the advance position, by the advancing and retracting member 20 covering the non-adhered location 12b of the workpiece main body 12, it is possible to prevent the surface skin material 14 from becoming adhered to the non-adhered location 12b, and the advancing and retracting member 20 can protect the surface skin material 14 and prevent damage from occurring to the surface skin material 14. In this case, the advancing and retracting member 20 may be retracted underneath the surface skin material retaining member 18. Consequently, the configuration of the apparatus can be made compact.

In the above-described workpiece molding apparatus 10, the interval d2, which is at least two times the thickness of the surface skin material 14, may be disposed between the advancing and retracting member 20 and the surface skin material retaining member 18. In accordance with this feature, when the advancing and retracting member 20 is moved to the retracted position, it is possible to prevent the surface skin material 14 from becoming caught in a gap between the advancing and retracting member 20 and the surface skin material retaining member 18. In this case, the advancing and retracting member 20 may be provided with the convex portion 39 projecting out in a direction perpendicular to the advancing and retracting direction toward the side of the surface skin material retaining member 18. By providing the convex portion 39, the gap between the surface skin material retaining member 18 and the advancing and retracting member 20 is narrowed at the advanced position. Therefore, even in the case that atmospheric pressure acts on the surface skin material 14 accompanying expulsion of air from the lower mold 32, the surface skin material 14 can be prevented from being damaged. A projecting length (thickness) of the convex portion 39 can be, for example, on the order of 5 mm.

In the above-described workpiece molding apparatus 10, at the advanced position of the advancing and retracting member 20, the end surface 39a of the convex portion 39 of the advancing and retracting member 20 may be formed at substantially the same position as the distal end portion 18e of the surface skin material retaining member 18. In accordance with this feature, at the advanced position of the advancing and retracting member 20, an unevenness in the vicinity of the gap between the surface skin material retaining member 18 and the advancing and retracting member 20 can be reduced, and damage to the surface skin material 14 can be prevented.

Second Embodiment

Figure 9:
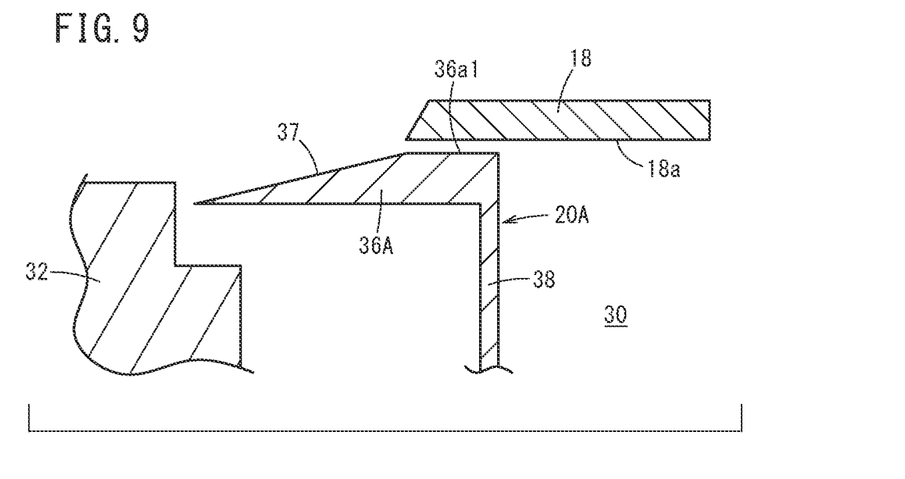
FIG. 9 is a cross-sectional view of an advancing and retracting member according to a second embodiment.

As shown in FIG. 9, according to the present embodiment, the shape of a shutter plate 36A of an advancing and retracting member 20A differs from the shape of the shutter plate 36 of the advancing and retracting member 20 of the first embodiment. As shown in the drawing, with the advancing and retracting member 20A of the present embodiment, a cutout portion 37 having an inclination so as to become thinner toward the distal end side is provided on the upper surface of the shutter plate 36A. The width of the gap between an upper surface 36a1 of the shutter plate 36A and the lower surface 18a of the surface skin material retaining member 18 may be less than or equal to two times the thickness of the surface skin material 14.

According to the present embodiment, when the shutter plate 36A is moved to the retracted position, the gap between the shutter plate 36A and the surface skin material retaining member 18 increases in accordance with the inclined surface of the cutout portion 37. As a result, it is possible to prevent the surface skin material 14 from becoming dragged in between the surface skin material retaining member 18 and the advancing and retracting member 20A.

Third Embodiment

Figure 10A:
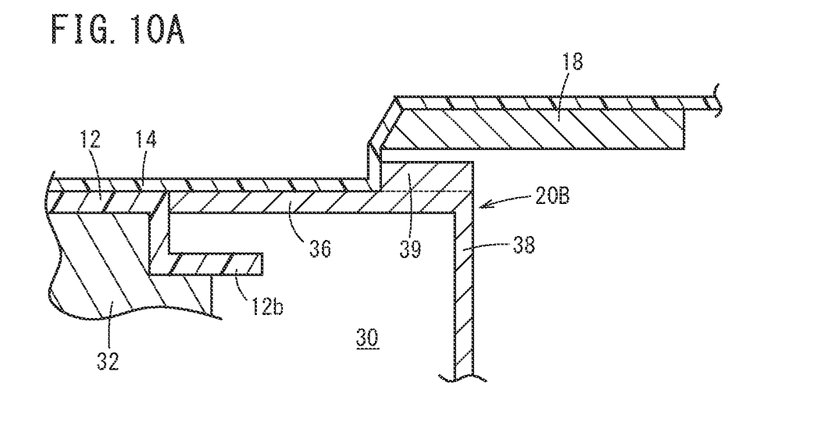
FIG. 10A is a cross-sectional view showing an advancing and retracting member according to a third embodiment at an advanced position.

According to the present embodiment, the direction of movement of an advancing and retracting member 20B differs from that of the advancing and retracting member 20 of the first embodiment (see FIG. 2A). As shown in FIG. 10A, the basic configuration of the advancing and retracting member 20B is the same as that of the advancing and retracting member 20 shown in FIG. 2A, and at the advanced position, the advancing and retracting member 20B is disposed at the same position as that of the advancing and retracting member 20.

Figure 10B:
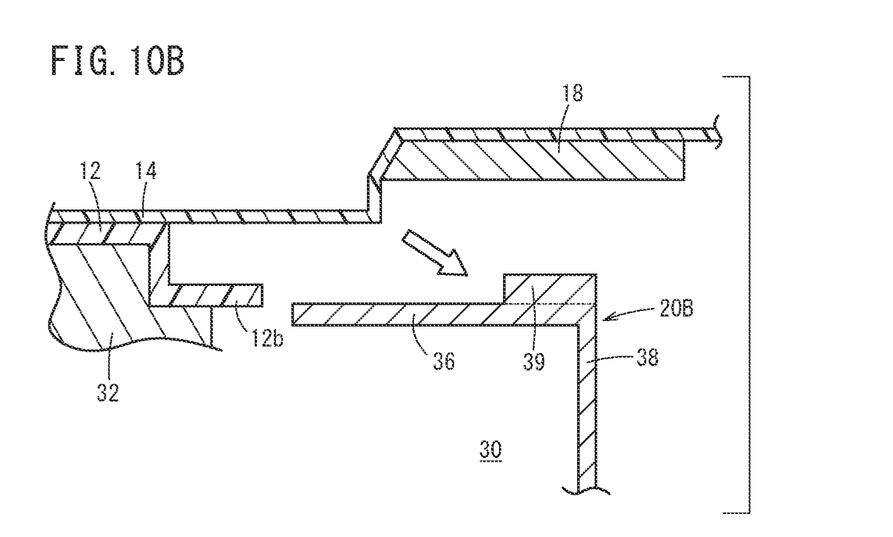
FIG. 10B is a cross-sectional view showing a retracting operation of the advancing and retracting member according to the third embodiment.

As shown in FIG. 10B, when the advancing and retracting member 20B is moved to the retracted position, the advancing and retracting member 20B undergoes movement while being displaced diagonally downward, as shown by the white outlined arrow in the drawing. In this manner, when the advancing and retracting member 20B is displaced to the retracted position, the advancing and retracting member 20B is displaced from the workpiece main body 12 while being displaced in the direction away from the surface skin material retaining member 18. Therefore, according to the present embodiment, when the advancing and retracting member 20B undergoes the retracting operation, it is possible to prevent the surface skin material 14 from being pulled into the gap between the surface skin material retaining member 18 and the advancing and retracting member 20B.

Although a description concerning the present invention has been presented above with reference to preferred embodiments, it goes without saying that the present invention is not limited to such embodiments, and various modifications can be made thereto without departing from the essence and gist of the present invention.

The invention claimed is:
1. A workpiece molding apparatus, comprising:
a lower mold supporting from below and holding by suction a workpiece in which a workpiece main body and a surface skin material are laminated together;
a surface skin material retaining member arranged laterally of the lower mold and configured to support from below a non-adhered location of the surface skin material where the surface skin material is not adhered to the workpiece main body;
an advancing and retracting member configured to, between the lower mold and the surface skin material retaining member, support from below the non-adhered location of the surface skin material and cover an upper side of the non-adhered location of the workpiece main body; and
an upper mold being arranged over the lower mold, the surface skin material retaining member, and the advancing and retracting member and pressing the workpiece from above.

2. The workpiece molding apparatus according to claim 1, further comprising a drive unit configured
- to cause the advancing and retracting member to be advanced to be between the surface skin material retaining member and the lower mold when the surface skin material is arranged on the workpiece main body, and
- to cause the advancing and retracting member to be retracted from between the surface skin material retaining member and the lower mold after the surface skin material and the workpiece main body have been adhered to each other.

3. The workpiece molding apparatus according to claim 1, wherein the advancing and retracting member is accommodated underneath the surface skin material retaining member.

4. The workpiece molding apparatus according to claim 1, wherein the advancing and retracting member is provided with a convex portion projecting out in a direction perpendicular to an advancing and retracting direction toward a side of the surface skin material retaining member.

5. The workpiece molding apparatus according to claim 4, wherein, at an advanced position of the advancing and retracting member, an end surface of the convex portion of the advancing and retracting member is formed at substantially a same position as a distal end portion of the surface skin material retaining member.

6. The workpiece molding apparatus according to claim 1, wherein the surface skin material retaining member is configured in a manner so that a step with respect to a position where the workpiece main body is retained is provided at a position where the surface skin material retaining member is retained.

7. A workpiece molding apparatus, comprising:
- a mold member including a pair of molds configured to sandwich a workpiece in which a workpiece main body and a surface skin material are laminated together, and hold the workpiece main body and the surface skin material by suction;
- a surface skin material retaining member arranged laterally of the mold member and configured to retain the surface skin material and provide a step between a retained position where the workpiece main body is retained and a retained position where the surface skin material is retained, at a non-adhered location where the surface skin material is not adhered to the workpiece main body; and
- an advancing and retracting member configured to cover an upper side of the non-adhered location of the workpiece main body when arranged on the step of the non-adhered location, wherein

- a gap is disposed between the advancing and retracting member and the surface skin material retaining member,
- the advancing and retracting member is provided with a convex portion projecting out in a direction perpendicular to an advancing and retracting direction toward a side of the surface skin material retaining member, and
- at an advanced position of the advancing and retracting member, an end surface of the convex portion of the advancing and retracting member is formed at substantially a same position as a distal end portion of the surface skin material retaining member.

\* \* \* \* \*